March 6, 1951 F. J. KENNEDY 2,544,232
ELECTRICAL OUTLET BOX
Filed June 1, 1948 2 Sheets-Sheet 1
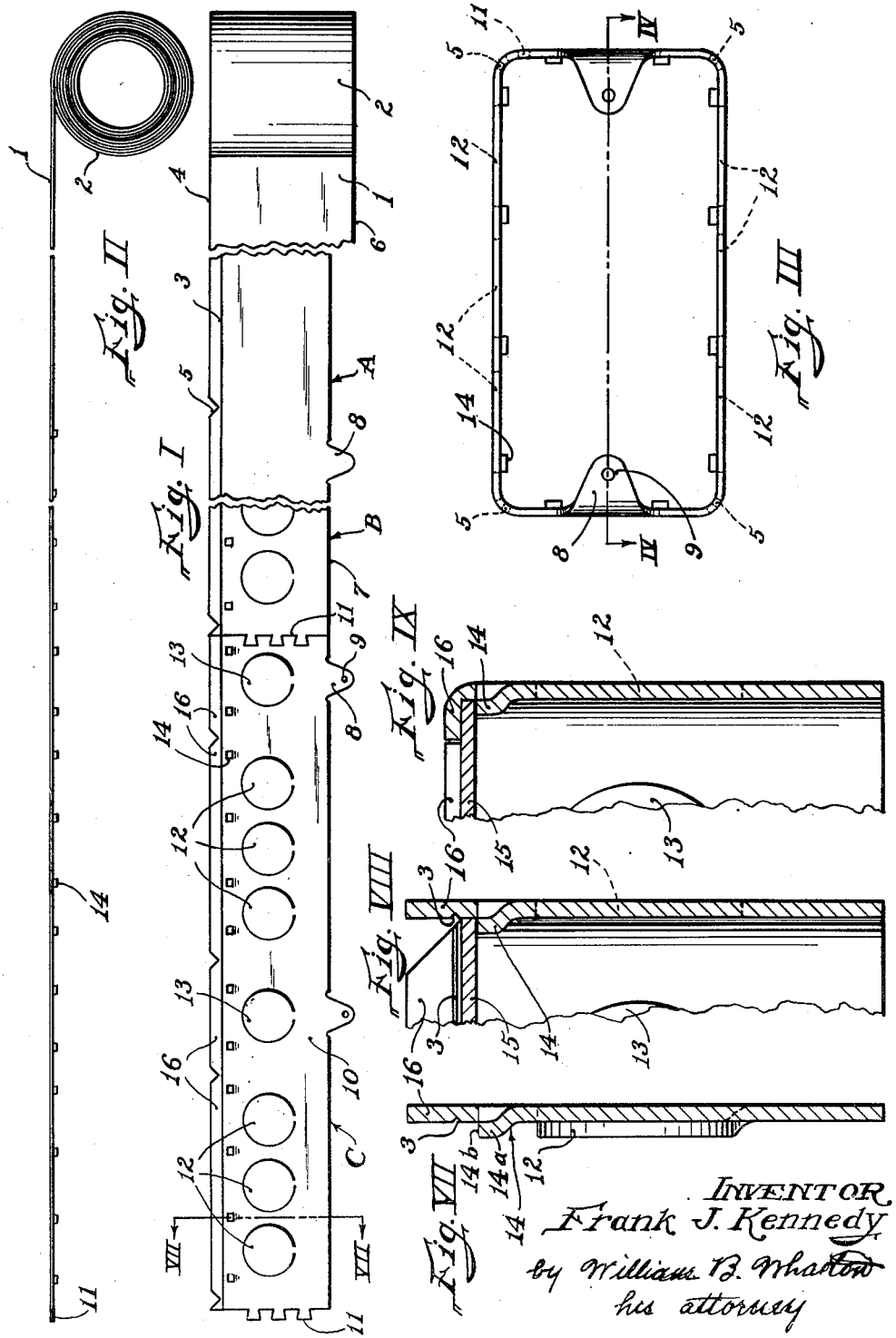

March 6, 1951  F. J. KENNEDY  2,544,232
ELECTRICAL OUTLET BOX
Filed June 1, 1948  2 Sheets-Sheet 2
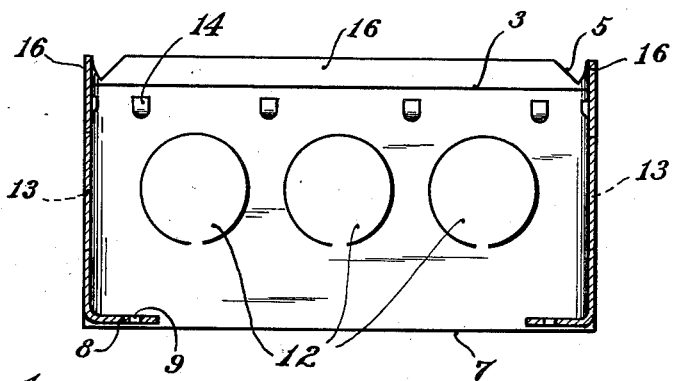
Fig. IV
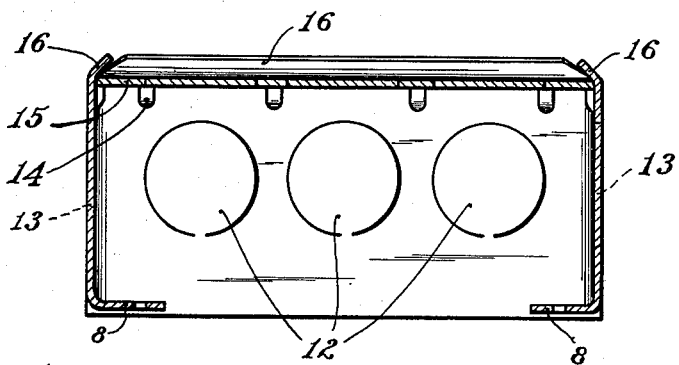
Fig. V
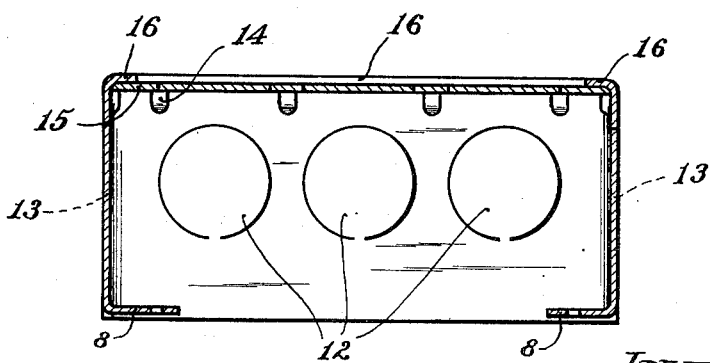
Fig. VI
INVENTOR
Frank J. Kennedy
by William B. Wharton
his attorney

Patented Mar. 6, 1951

2,544,232

UNITED STATES PATENT OFFICE 2,544,232

ELECTRICAL OUTLET BOX

Frank J. Kennedy, Brooklyn, N. Y., assignor to National Electric Products Corporation, Pittsburgh, Pa., a corporation of Delaware Application June 1, 1948, Serial No. 30,221

1 Claim. (Cl. 220—3.94)

This invention relates to an electrical outlet and junction box, hereinafter designated simply as an "outlet" box.

One object of the invention is to provide a fabricated outlet box which is firmly integrated and sturdy in its structure, and particularly in the tightness and security with which the bottom of the outlet box is integrated with the other outlet box structure.

Another object of the invention is to provide a fabricated outlet box possessing the properties above noted which is integrated wholly by means of the substance of its primary structural parts, without welding or soldering and without the use of added connecting parts or pieces.

Another object of the invention is to provide an outlet box of such simple structure and to produce such box by a method so simple and direct that the outlet box is expeditiously and economically manufactured and that waste of metal in scrap is minimized.

A still further object of the invention is to provide an outlet box having the above noted properties which also has sharply defined contours and the wall structure of which presents extended plane surfaces connected on relatively short radii.

Electrical outlet boxes are used in great numbers, are subjected to rough handling in installation and are subjected when installed to jars and vibration which may be of great severity. The bottom wall of an outlet box lies against a building wall or other structure directly to mount the outlet box and the bounding walls of the outlet box support at their knockouts electrical devices of various sorts, so that there are exerted on a mounted outlet box forces tending to separate or loosen the connection between the bottom wall and other walls of the outlet box. It is desirable that the bottom wall of the outlet box should lie dead against a plane surface on which the outlet box is mounted, without tendency to rock on such surface.

All the above objects are attained and all the above requirements are met by the outlet box of my invention. All prior art outlet boxes fail in some one or more properties to attain those objects or to meet those requirements. Outlet boxes made by deep-drawing operations are of course well integrated but the walls of such a box meet on long radii, the greater proportion of the wall area is not truly plane, the deep-drawing is relatively slow and expensive and the scrap loss is high. In prior fabricated boxes the connection between the bottom wall and the bounding walls of the box is relatively loose and insecure, or is effected by welding, as is also the integration of the bounding wall structure, with consequent increase in time and equipment necessarily employed in making the outlet box.

In a preferred embodiment, my outlet box has longer or side walls and shorter or end walls bent from a single length of preformed metal strip the ends of which are united by an interlocked, weldless, joint. Retainer feet for engagement by a separately formed bottom wall or plate are punched out of the substance of the side and end walls in spaced relation with the adjacent edges thereof. The walls are scored with a groove parallel to the bottom edges of the walls and spaced to form a line of prepared flexure spaced by the thickness of the bottom wall from a line defined by the plurality of retainer feet. The bottom wall is clinched against the retainer feet by clinching flanges which are bent over at the score line and brought into clinching engagement with a bottom wall forced against the retainer feet.

The method of making my outlet box involves progressively forming the side and end walls by unwinding strip of suitable width from a coil and scoring it parallel to one edge while forming notches spaced along said edge. I stamp out the bottom retainer feet and the customary knockouts in successive stages, sever the proper length of strip along a dovetail shear line, then bend the length to bring its ends together and assemble the separately formed bottom plate with the side and end walls thus produced.

A complete understanding of the invention may be obtained from the following detailed description and explanation which refer to the accompanying drawings illustrating a preferred embodiment and practice. In the drawings, Fig. 1 is a side elevation of the strip as it is unwound from a coil, showing the successive stages of the formation thereof into a blank comprising the elements of a continuous outlet box wall including sides and ends.

Fig. II is a plan view corresponding to Fig. I but omitting the showing of knockouts because of the inherent limitations of illustration in this dimension.

Fig. III is a plan view of the side and end wall structure of the outlet box following the bending and integration of a prepared piece to provide the ambient wall structure of the box.

Fig. IV is a longitudinal section through the box taken in inverted position of the box in the plane of section line IV—IV of Fig. III.

Fig. V is a view similar to Fig. IV showing marginal bottom portions, or clinching flanges, of the side and end walls partly bent over marginal regions of the bottom wall or plate of the outlet box.

Fig. VI is a view similar to Figs. IV and V showing the marginal portions, or clinching flanges, of the side and end walls in bottom-clinching position.

Fig. VII is a sectional detail view on an enlarged scale, taken in the plane of the section line VII—VII of Fig. I, illustrating the structure of a piece prepared for the bounding wall structure of the box before its formation and integration into such structure.

Fig. VIII is a fragmentary sectional view taken in correspondence to the section and scale of Fig. VII but illustrating the stage in the integration of the outlet box shown in Fig. V.

Fig IX is a view similar to Fig. VIII but illustrating on an enlarged scale the completion of the operation of integrating the outlet box as shown in Fig. VI.

Referring initially to Figs. I and II of the drawings, metal strip 1 is unwound progressively and with a minimum of spaced interruptions from a coil 2 mounted in any suitable manner. As unwound, the strip is passed step-by-step through the appropriate instrumentalities of a multislide press which act progressively on successively presented lengths of the strip.

In the region A closest to the coil, a continuous groove 3 is impressed parallel to one edge 4 (later to be incorporated in the bottom structure of the outlet box) and spaced substantially from the edge. Also V-notches are cut out from the marginal region lying between edge 4 and groove 3. At the opposite edge of the strip 6 (later to be the upper edge of the outlet box) marginal material is cut away in regions indicated at 7 to leave spaced ears or lugs 8.

In the next operation a piece of strip 1 corresponding in dimensions to the length A, the action on which has been described, is defined. In the second action of the press holes 9 are punched in lugs 8. Also the length 10 of the strip, which may be now considered as a prospective piece B, is defined by transverse lines of severance 11. In this action knockouts 12 are pressed from regions of the piece which ultimately are to serve as the longer or side walls of the outlet box, and similar knockouts 13 are pressed in the regions which are ultimately to form the shorter or end walls of the outlet box. The groove 3 is deepened and a line of retainer feet 14 is defined and the retainer feet are partially pressed from the substance of the strip to extend on the same side of the strip as the groove 3 in a line parallel to the groove and spaced inwardly from it a distance which is regulated by the desired thickness of the bottom plate for the outlet box which is subsequently to be applied.

In the next action the length of strip is formed into a knockoff piece C. In that piece the lines of severance 11, which are of dovetail formation and which had been slightly impressed in the strip, are made deeper and as shown one of those lines of severance stands as a free dovetail edge because of the succeeding action in which a piece is knocked off and formed. It should be noted that in each piece the dovetail ends formed at the lines of severance match, inasmuch as the dovetail tangs and notches at the leading end of each piece have been formed with complementary notches and tangs at the trailing end of the next preceding piece. In piece C retainer feet 14 are fully formed, being severed to provide spaced planar slits along a line adjacent groove 3 inwardly of the adjacent edge of the piece C, and deflected into a position and form in which a portion 14a of each of the feet stands parallel to the body of the strip and presents a free edge or abutment 14b substantially perpendicular to the plane of the strip.

In the above noted successive actions the three lengths of strip A, B and C are acted on simultaneously as the strip is advanced step-by-step and for this reason the three lengths A, B and C are shown in Fig. I as simultaneously existing, the lengths A and B being shown in fragmentary manner and the final or knockoff piece C being completely shown. There is also a fourth length simultaneously acted on in the press, such length which is a piece similar to piece C, has been severed and formed into the bounding wall structure of the outlet box. Relating this final action of the press to piece C, that piece next is knocked off and is formed by dies into the bounding wall structure of the outlet box, as shown in Figs. III and IV. In this action knockouts 12 and 13 which have projected from the plane of the strip are forced back into line with it, and lugs 8 are bent over to a position at right angles with the plane of the walls from the edges of which they extend. The matching dovetails at the opposite ends of the piece are brought together and are forced into interlocking relation with each other to form an interlocked joint. The marginal regions of the strip lying between edge 4 and the score line are shaped with the remainder of the wall portions with which they are coextensive to provide a plurality of upstanding flanges separated by the notches 5.

Referring particularly to Figs. IV, V and VI of the drawings which illustrate the formation of the outlet box, Fig. IV shows the bounding wall structure of the outlet box standing in inverted position with score lines 3 and retainer feet 14 extended completely around the box and with the interval between the upper edges of the retainer feet and the score line clearly defined. Clinching flanges lying beyond the score line remain in upstanding position continuous with the plane of the walls. In this position and relation of its elements the partially fabricated outlet box is placed in a suitable press and bottom plate 15 is applied to rest on retainer feet 14.

In Fig. V bottom plate 15 is shown in a position occupying the space between the upper edges of the retainer feet and the groove. Clinching flanges 16 have been bent over by the press to a position in which they stand at an angle of 45° or slightly more with the planes of the bounding walls, marginally to overlie the bottom plate.

In Fig. VI the outlet box is shown in completed form as effected in the next pressing operation. In this final stage bottom plate 15 is tightly and securely engaged with the side walls solely by the clinching effect of flanges 16 which are forced downwardly into full clinching position on marginal regions of the bottom plate against the solid backing provided by the plurality of upstanding retainer feet 14.

It should be understood that the integration of the bottom wall or plate with the bounding walls of a fabricated outlet box presents a serious problem. If such bottom be integrated in the assembly by welding it to the bounding walls the welding is performed in separate welding apparatus adapted to the purpose, and the operation by consuming a considerable amount of time in handling and in making the weld adds a large item of cost to the manufacture of the fabricated box. There is substantial scrap loss by reason of imperfect welding and if the box be dropped or forcefully struck there is danger of breaking the weld. The expedient of using lugs, such as the attachment lugs 8 of the applicant's outlet box, also is unsatisfactory. While those lugs are suitable for the attachment of a cover, or the like, an attempt to secure a bottom plate or wall in position by engaging it between alternately positioned lugs has proven inadequate, because it permits play between the bottom plate of the outlet box and its bounding walls and progressive loosening with handling and under jars or vibration. The attachment of the bottom plate by screws or rivets also is unsatisfactory.

In engaging the bottom plate of the outlet box to the bounding walls by a pressed engagement the problem thus is to effect a clinching which is sufficiently secure and tight to hold the bottom plate permanently and immovably in position. In my outlet box such clinched engagement is obtained by providing a firm resistant backing at one side of the plate against which backing the pressing operation can be performed, and to bring the engaging flanges which secure the bottom plate against such backing into full clinching position. The parts by which that effect is obtained are shown in detail in Figs. VII, VIII and IX of the drawings.

Thus considering Fig. VII it will be seen that foot 14 presents its edge 14b in a plane at right angles to the plane of the strip and that it is initially severed along that edge and deflected away from the plane of the wall toward what is to be the cavity of the outlet box, to provide a seating surface or abutment 14b in a region which is removed from the nearest edge of the strip. Foot 14 thus is not of the nature of an ear or lug formed at the edge of the wall, but the foot has a rigidity attendant upon its location and the fact that it has a substantial reach 14a extended parallel to the wall. By using a plurality of feet 14 of relatively small size a rigid backing which is capable of sustaining great pressure is provided as a clinching seat for bottom plate 15. Further referring to Fig. VII, it will be seen that groove 3 is spaced from both the edges 14b of feet 14 and from the extreme edge 4 of the strip.

Fig. VIII shows the condition preparatory to the clinching action. In this figure of the drawings bottom plate 15 rests on the edges 14b of the feet and against the inner surface of the bottom wall to occupy space between the edges 14b and groove 3. Clinching flanges 16 standing outwardly of groove 3 and separated by V-notches 5 have uninterrupted reaches extending each along one of the four bounding walls of the outlet box.

Fig. IX shows bottom plate 15 securely clinched against retainer feet 14 by folding clinching flanges 16 at grooves 3 and pressing them forcefully against marginal regions of bottom plate 15, which in turn is forced firmly against the plurality of retainer feet 14. In this action, which preferably is effected in two stages as is illustrated in Figs. V and VI of the drawings, groove 3 performs an important function. This is to cause the clinching flanges to be folded cleanly and sharply against the adjacent edges of the bottom plate as well as to facilitate the bending. Thus the edges of bottom plate 15 being received in the space provided by groove 3, a clean positive clinching joint is made, securely and immovably to integrate the bottom plate with the bounding walls of the outlet box.

As explained, the elements shown and described and illustrated in detail in Figs. VII, VIII and IX, result in the formation of a firmly integrated outlet box which possesses all the advantageous features of a fabricated outlet box in conjunction with all the advantageous features of a deep-drawn outlet box. Thus the integration of the box is such that the bottom is held securely and immovably with the bounding walls against rough handling and the jars and vibrations of service. The outlet box has a bottom structure which rests flat and dead on a plane surface and the radii along the edges of the bottom and at the junction of the side and end walls of the box are so short as to give the outlet box a sharply defined contour and provide a maximum of space within the box. The outlet box is manufactured by a method which is both rapid and inexpensive inasmuch as it avoids the relatively unsatisfactory modes of integrating the bottom of the outlet box with the bounding walls which previously have been practiced. The box as a whole is weldless, the entire integration being effected by the substance of its primary structural parts without welding or soldering and without the use of added connecting parts or pieces. The scrap loss is very low, both in minimizing the metal which is cut away in preparing a structural piece and in forming it into the bounding wall structure of the outlet box and in the scrapping of completed or partially completed outlet boxes because of defects. In the later instance great advantage is presented over the manufacture of outlet boxes by a deep-drawing operation in which the scrap loss is high because of the high proportion of defective boxes produced by that operation.

Although I have illustrated and described only a preferred embodiment and practice of the invention, it will be recognized that changes in the structural detail and procedure disclosed may be made without departing from the spirit of the invention or going beyond the scope of the appended claim.

I claim as my invention:

In an electrical outlet box comprising a one-piece bounding wall structure and a bottom structure, the combination of a plurality of retainer feet, said feet being formed by spaced planar slits in the wall structure spaced inwardly from one edge thereof with the material of the wall structure on the side of the slit opposite said edge being displaced inwardly of the space bounded by said wall structure forming outwardly facing abutments, a separately formed bottom plate lying against the abutments of said feet, and clinching flanges of one piece with the said bounding wall structure lying marginally against the said bottom plate in opposition to the said retainer feet in cooperative clinching relation with respect to said feet and the said bottom plate.

FRANK J. KENNEDY.

REFERENCES CITED

The following references are of record in the file of this patent:

UNITED STATES PATENTS

| Number | Name | Date |
|---|---|---|
| 180,329 | Duc, Jr. | July 25, 1876 |
| 607,989 | Erickson | July 26, 1898 |
| 781,778 | Leppert | Feb. 7, 1905 |
| 782,417 | Robb | Feb. 14, 1905 |
| 1,072,009 | Keefe | Sept. 2, 1913 |
| 1,428,195 | Wahl et al. | Sept. 5, 1922 |
| 1,447,600 | Olevin | Mar. 6, 1923 |
| 1,471,340 | Knight | Oct. 23, 1923 |
| 1,971,908 | Fullman | Aug. 28, 1934 |
| 2,076,342 | Hildebrandt | Apr. 6, 1937 |

FOREIGN PATENTS

| Number | Country | Date |
|---|---|---|
| 29,162 | Great Britain | 1911 |